(12) United States Patent
Seidl et al.

(10) Patent No.: US 6,967,920 B2
(45) Date of Patent: Nov. 22, 2005

(54) SMART INTERFACE FOR PAYLOAD TRANSFERS IN NETWORKING APPLICATIONS

(75) Inventors: Michael Seidl, Richardson, TX (US); Jun Tang, Plano, TX (US); Zhicheng Tang, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 939 days.

(21) Appl. No.: 09/911,338

(22) Filed: Jul. 23, 2001

(65) Prior Publication Data

US 2003/0016670 A1    Jan. 23, 2003

(51) Int. Cl.[7] .............................................. H04J 3/14
(52) U.S. Cl. ..................................... 370/230; 370/368
(58) Field of Search ................................ 370/229–235, 370/389, 392, 393, 394, 395.1, 397, 395.3, 370/395.31, 428, 429, 368, 371, 374, 379, 370/381, 421

(56) References Cited

U.S. PATENT DOCUMENTS

| | | | | |
|---|---|---|---|---|
| 5,659,758 | A * | 8/1997 | Gentry et al. | ................ 710/260 |
| 6,456,590 | B1 * | 9/2002 | Ren et al. | .................... 370/229 |
| 6,529,986 | B1 * | 3/2003 | Chen et al. | .................. 710/263 |
| 6,615,305 | B1 * | 9/2003 | Olesen et al. | ............... 710/262 |
| 6,845,105 | B1 * | 1/2005 | Olsson et al. | ............... 370/469 |

\* cited by examiner

*Primary Examiner*—Dang Ton
*Assistant Examiner*—Phuc Tran
(74) *Attorney, Agent, or Firm*—Abdul Zindani; W. James Brady, III; Frederick J. Telecky, Jr.

(57) ABSTRACT

An apparatus and method for improving data transfers between a network and a network device is provided. The apparatus comprising a data input, a programmable counter adapted to counting the number of data packets received, an interrupt generator for signaling a microprocessor upon a signal from said programmable counter, a data processing block for examining the contents of data packets for an end-of-packet flag, and an output.

16 Claims, 4 Drawing Sheets

SMART INTERFACE FOR PAYLOAD TRANSFERS IN NETWORKING APPLICATIONS

FIELD OF THE INVENTION

This invention relates generally to data networks, and more particularly, to providing high-bandwidth and low-latency communications for devices attached to a network without placing a large performance burden on microprocessors of the devices.

BACKGROUND OF THE INVENTION

A network device that is attached to a network must know when new data has arrived. However, due to the fact that the network device is usually performing some task or executing some application, it is not normally free to wait on the arrival of new data. The network device must depend on a network interface device or the network device must periodically check for the arrival of new data. If the network device is not notified about or if it does not check for the arrival of new data, the new data may sit in storage for extended periods of time, possibly resulting in the loss of some data due to a storage buffer overrun. Additionally, if the network device does not know about the arrival of new data, applications that need the new data will not be provided the new data and the application's overall performance will suffer.

There are several widely used techniques for detecting the presence of new data, including microprocessor interrupts and polling. Techniques using microprocessor interrupts depend on a network interface device, such as a modem or a network interface card, to assert a microprocessor interrupt whenever the network interface device receives data from the network. When the network device's microprocessor receives the microprocessor interrupt, it will put aside whatever it is currently doing and process the new data. Alternatively, in techniques that use polling, the network device's own microprocessor periodically stops whatever it is doing and checks a special memory location, commonly referred to as a shared variable, to see if new data has arrived. The special memory location is called the shared variable because multiple devices (the network device and the network interface device) have access, both read and write, to the memory location. The network interface device, upon receipt of new data, will change the value stored in the shared variable, signifying the arrival of new data. The network device's microprocessor, upon checking the shared variable, will see that it has been changed and know that new data has arrived.

Techniques that use microprocessor interrupts and/or polling can have significant disadvantages. Whenever the network device's microprocessor receives a microprocessor interrupt, it must stop whatever application it is executing to process the interrupt. To be able to return to what it was doing, the microprocessor must save its state, i.e., the microprocessor must save all of its register values, and swap out the application it was executing to memory, and then process the data. The process of saving state followed by the changing of applications is often referred to as a context switch. After the microprocessor finishes processing the data, the application that was swapped out restored, the state of the microprocessor must be restored, and then the microprocessor can return to executing the application.

In polling, the microprocessor must periodically check the shared variable to see if new data has arrived. Before the microprocessor can perform the polling operation, it must also perform a context switch. After the microprocessor completes the polling operation, it must perform another context switch to return to its pre-polling state.

In high-performance networks which also guarantee a certain minimum level of performance for network connections, such as an Asynchronous Transfer Mode (ATM) network, the context switches associated with frequent microprocessor interrupts and polling can take a heavy toll on the performance of the network device. If microprocessor interrupts or polling occurs too frequently, a large amount of time will be wasted performing context switches. However, if microprocessor interrupts or polling occurs too infrequently, then the minimum level of performance may not be met and the network does not perform to specifications.

The use of microprocessor interrupts and polling requires that network performance guarantees be balanced with overall loading on the network device's microprocessor. For example, if microprocessor interrupts are used, then the amount of new data received should exceed a certain threshold before an interrupt is asserted. Otherwise, the time spent in the context switches required to process the interrupts could overload the microprocessor, greatly reducing the microprocessor's ability to perform other work. However, if the threshold is set too large, i.e., a large amount of new data must be received before the microprocessor interrupt is asserted, then the latency for processing early arriving data (new data whose arrival did not exceed the threshold) may exceed the guaranteed latency requirements. A similar situation occurs with polling, where if too much time is allowed to elapse between polling events, then the latency for processing the data may exceed the guaranteed latency requirements. On the other hand, if the polling period is too small and polling occurs too frequently, then the time spent in the context switches required to perform polling would overload the microprocessor. A need has therefore arisen for a technique supporting information transfers in a network that is capable of meeting bandwidth and latency guarantees and does not place an undo burden on the network device's microprocessor.

SUMMARY OF THE INVENTION

In one aspect, the present invention provides an apparatus for improving data transfers in network applications comprising a data input, a programmable counter adapted to counting the number of data packets received and signaling an interrupt generator when the number of data packets received exceeds a specified threshold, said interrupt generator adapted to interrupting a network device's microprocessor upon a signal from said programmable counter, a data processing block for examining the contents of data packets for an end-of-packet flag, and an output.

In another aspect, the present invention provides an apparatus for improving data transfers in network applications comprising a data input, a programmable counter adapted to counting the number of data packets received and signaling an interrupt generator when the number of data packets received exceeds a specified threshold, a timer adapted to measuring elapsed time between arrival of first new data and current time and signaling said interrupt generator when said elapsed time exceeds a specified time threshold, an interrupt generator adapted to interrupting a network device's microprocessor upon a signal from said programmable counter or said timer, a data processing block for examining the contents of data packets for an end-of-packet flag, and an output.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Figure 1:
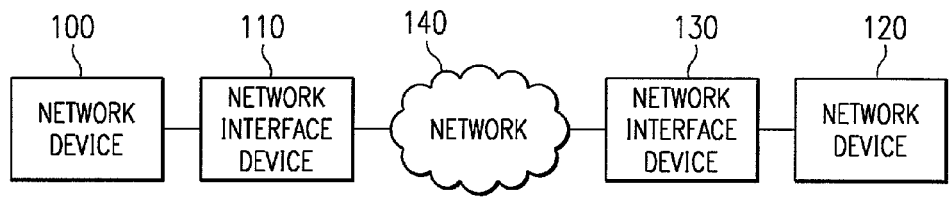
FIG. 1 is a block diagram illustrating a typical network device and network interface device combination connected with another network device and network interface device combination via a network.

Referring now to FIG. 1 for a block diagram illustrating a typical installation of several network devices and network interface devices connected via a network. A first network device (ND) 100 is coupled to a first network interface device (NID) 110. The network device 100 may be a personal computer or any of a large variety of network appliances such as, but not limited to, dumb data terminals, personal data assistants (PDAs), personal information managers (PIMs), cellular and personal communications system (PCS) telephones, smart picture frames, Internet radios, video gaming machines, and streaming audio and video players. The network interface device 110 may be a modem or a network interface card and maybe internal or external to the network device 100. A similar or different configuration may exist for a second network device 120 and its corresponding network interface device 130.

Connecting the two network device/network interface device (ND/NID) pairs is a network 140. While FIG. 1 displays two ND/NID pairs, any number of these pairs may be attached to the network 140 and usually, there are more than two ND/NID pairs attached to a network. The network 140 can be a private network, a public network, or a combination of the two. It can be a hardwired network, or it can be wireless, using radio frequency, infrared, laser, microwave, or any other communications media suitable for transmission of data, or a mixture thereof. An example of the network 140 can be an Asynchronous Transfer Mode (ATM) network with data being transmitted on twisted-pair media supporting an Asymmetric Digital Subscriber Line (ADSL).

Figure 2:
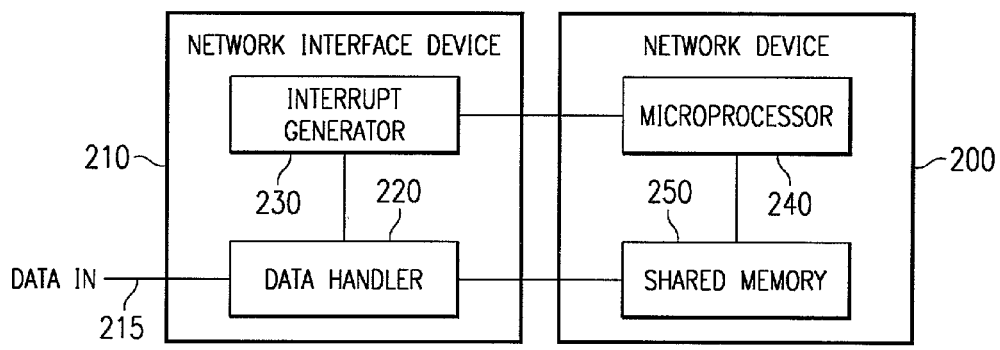
FIG. 2 is a diagram illustrating a well known microprocessor interrupt based system for notifying a network device of the arrival of new data.

Refer now to FIG. 2 for a block diagram illustrating a well known microprocessor interrupt based system for announcing the arrival of new data. FIG. 2 displays a ND 200 coupled to a NID 210 which in turn is coupled to a network via a physical network connection 215. When data arrives at the NID 210 from the network via the physical network connection 215, a data handler 220 within the NID 210 performs any necessary processing to receive the data and then stores the data away in a shared memory 250 inside the ND 200. Necessary processing of received data may include, but is not limited to decoding and error detection and correction. The data handler 220 can be as simple as a small amount of digital logic or as complex as a microprocessor, depending on the complexity of the processing needed on the data received from the network. The shared memory 250 is displayed in FIG. 2 as being located inside the ND 200, however, it is also possible to have the shared memory 250 inside the NID 210 or even external to both the NID 210 and the ND 200.

After saving the data in shared memory 250, the data handler 220 signals an interrupt generator 230 to generate a microprocessor interrupt. In an ATM network, where the smallest units of data are data packets or protocol data units (PDU) and the data transmission units are cells, with each PDU being comprised of at least one cell. The cells are referred to as user-network interface cells or UNI cells. When a PDU is larger than one cell, the cell containing the end of the PDU is referred to as an end-of-packet UNI cell and is specially marked with an end-of-PDU marker. For ATM networks, the arrival of a new cell is not sufficient to result in the interrupt generator 230 generating a microprocessor interrupt. Only when an end-of-packet UNI cell arrives at the NID 210 does the interrupt generator 230 generate a microprocessor interrupt. This is due to the fact that in ATM networks, the smallest data unit that is processed by the ND 200 is the data packet and not a UNI cell (unless the UNI cell is in itself a complete data packet). Therefore, generating a microprocessor interrupt when there is not a complete data packet within the shared memory 250 is a complete waste of time. ATM networks and their associated packet and cell structure are used in these specifications to describe the preferred embodiments of the present invention. However, the invention should not be construed as being limited to using only ATM networks.

The interrupt generator 230 is coupled to a microprocessor 240 located inside the ND 200. Upon receiving the microprocessor interrupt, the microprocessor 240 saves its current state and services the interrupt (process the newly arrived data) and restore its saved state. As stated previously, if microprocessor interrupts arrive too frequently, a heavy load is placed upon the microprocessor 240 and prevents it from performing its normal tasks in an efficient and timely manner. However, if microprocessor interrupts are not generated in a timely manner, data maybe lost if storage buffers are overrun and network performance guarantees may not met.

Figure 3:
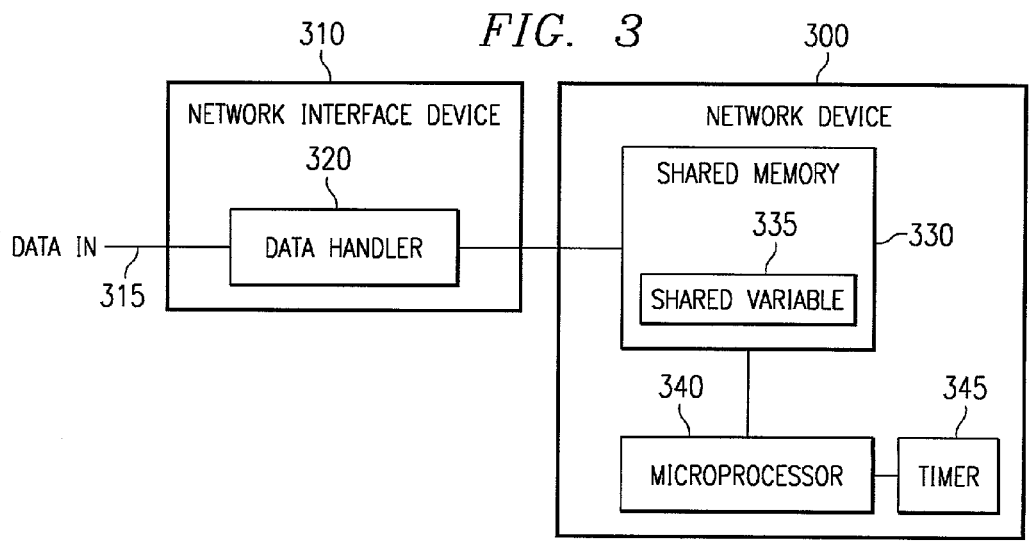
FIG. 3 is a diagram illustrating a well known polling based system for allowing a network device to detect the arrival of new data.

A commonly used alternative to microprocessor interrupts is polling. Refer now to FIG. 3 for a block diagram illustrating a polling based system for detecting the arrival of new data. A system using microprocessor interrupts can be thought of as a system that announces the arrival of new data while a system that uses polling detects the arrival of new data. FIG. 3 displays a ND 300 coupled to a NID 310, which in turn is coupled to a network via a physical network connection 315. When new data arrives at the NID 310 via the physical network connection 315 and after it is processed by a data handler 320, the new data is saved to a shared memory 330. Again, the shared memory 330 can be internal to the ND 300 or the NID 310 or neither. As the data handler 320 saves the new data to the shared memory 330, it also updates a shared variable 335. The shared variable 335 can be a memory location within the shared memory 330, or it may be a register within the ND 300 or the NID 310, or it may be external to both the ND 300 and the NID 310.

Inside the ND 300 is a microprocessor 340 that controls the operation of the ND 300. Coupled to the microprocessor 340 is a timer 345. The timer 345 measures elapsed time and once the elapsed time is equal to an amount of time loaded into the timer 345, the timer 345 signals the microprocessor 340 that time has expired. The timer 345 is used to measure the elapsed time between a previous polling event and the current time, i.e., the timer 345 is used to ensure the periodic occurrence of polling events. The timer 345 may actually be a task executing inside the microprocessor 340 or it may be a hardware timer external to the microprocessor 340 as shown in FIG. 3. The amount of time loaded into the timer 345 is dependent on the desired polling frequency and network performance guarantees, such as maximum network latency, and physical limitations of the ND 300, such as data buffer size. The actual amount of time loaded into the timer 345 may be loaded at system startup or it may be periodically updated by the microprocessor 340 to meet changing network conditions, performance requirements, or user specifications.

After being signaled by the timer 345, the microprocessor 340 saves its current state and accesses the shared variable 335. If the contents of the shared variable 335 tells the microprocessor 340 that the data handler 320 has saved new data into shared memory 330, then the microprocessor 340 will reset the timer 345 and process the newly arrived data. After it finishes processing the new data, the microprocessor 340 goes back to what it was doing previously by restoring its saved state. If the shared variable 335 had not been changed, the microprocessor 340 resets the timer 345 and returns to its normal operation. In an ATM system, PDUs are transmitted as UNI cells. However, they are only processed on a PDU basis. This means that even when there are multiple UNI cells stored in the shared memory 330, but if they do not comprise at least one complete PDU, then the microprocessor 340 will examine the UNI cells in response to the signaling by the timer 345, but it will not process the UNI cells or remove them from the shared memory 330.

As with microprocessor interrupts, the performance of the network device 300 is heavily dependent upon the polling frequency. If the value loaded into the timer 345 is too small, the microprocessor 340 must stop what it is doing too frequently and is prevented from performing its normal tasks in an efficient and timely fashion. If the value is too large, performance guarantees may not be met and data may be lost if data buffers are overrun.

Figure 4:
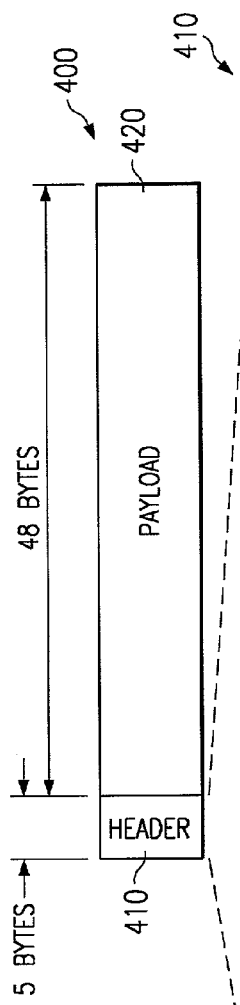
FIG. 4 is a diagram illustrating an asynchronous transfer mode user-network interface (UNI) cell.

Refer to FIG. 4 for a block diagram displaying an asynchronous transfer mode (ATM) user-network interface (UNI) cell 400. The ATM UNI cell 400 is an example of the type of data that can be supported by a ND/NID pair according to the preferred embodiment of the present invention. As previously stated, ATM networks and their associated packet and cell structure are used here to describe the preferred embodiments of the present invention. This invention should not be construed as being applicable to only ATM networks.

The UNI cell 400 is 53 bytes long in size and is comprised of two parts, a header 410 and a payload 420. The header 410 is five bytes long while the payload 420 is 48 bytes long. The header 410 contains control information, including payload type information (PT 460) and header error control information (HEC 480). Other portions of the header 410 are not relevant to this discussion and will not be discussed. The PT 460 is a three-bit field that provides information regarding the type of data being carried in the payload 420. In the case when a PDU is segmented across multiple UNI cells, i.e., when the data to be transmitted was too large to fit into a single UNI cell, the third bit of the PT 460 field is used to signify the last cell of a multi-cell group. If a PDU can fit in a single UNI cell, the third bit of the PT field is also set to indicate that the UNI cell marks the end of a PDU. The HEC 480 is an eight-bit field used to provide error protection for the header 410.

The payload 420 is a fixed 48-byte sized field. In the case when the data being transmitted is less than 48 bytes in size, padding is used to fill the remainder of the 48 bytes. In the case when the data being transmitted is greater than 48 bytes in size, the data is segmented into 48 byte chunks and a group of multiple UNI cells is used to transmit the data. The UNI cell of the group of multiple UNI cells that contains the end of the data is a special cell is marked as the last UNI cell and is referred to as an end-of-packet UNI cell.

Figure 5:
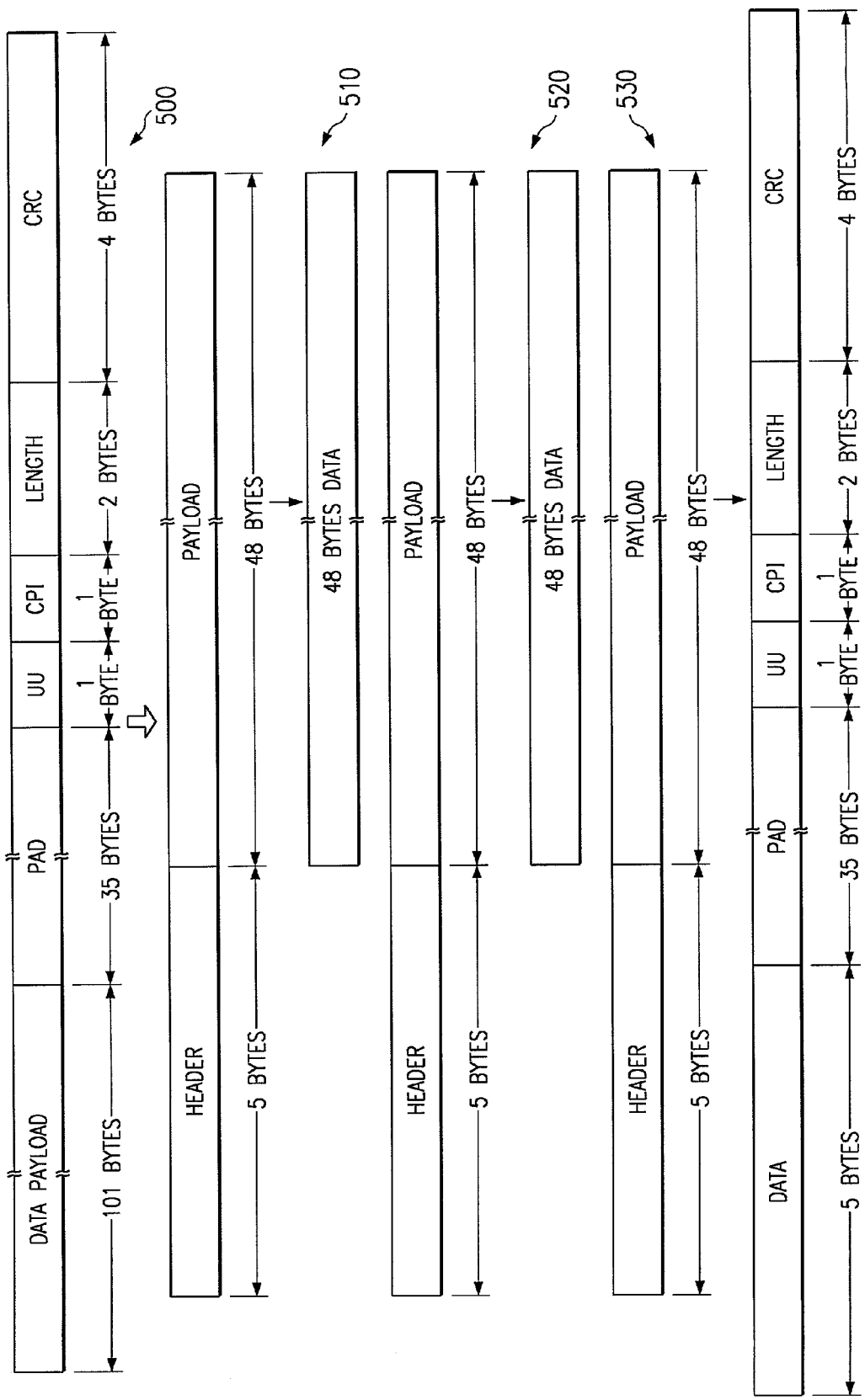
FIG. 5 is a diagram illustrating a long data packet segmented into smaller cells for purposes of transmission.

Refer to FIG. 5 for a block diagram displaying a PDU being segmented into multiple ATM UNI cells. A PDU can carry a variable amount of data, depending on application. FIG. 5 displays a PDU 500 that is typical of any PDU being transmitted by the ATM network. The PDU 500 displayed is comprised of a 101-byte long data payload and 35-byte long pad and eight bytes of control data. Since a UNI cell has only a 48-byte long payload, the PDU 500 must be segmented into smaller parts in order to fit into UNI cells. The PDU 500 is broken up into three UNI cells 510, 520, and 530. The first two UNI cells 510 and 520 have payloads of 48 bytes each, for a total of 96 bytes of data out of the original 101 bytes of data in the PDU 500. The third UNI cell 530 has a payload that contains 5 bytes of data, a 35-byte pad and the eight bytes of control data, adding up to a total of 48 bytes, the size of a UNI cell payload. The third UNI cell 530 is marked as the last cell of the three cells by setting the third bit of the PT field in the third UNI cell 530. The third bit of the PT field is also known as an end-of-PDU marker. Because ATM ensures in-order delivery of UNI cells, only the last cell of a multi-cell group needs to be marked. If a PDU fits within a single UNI cell, i.e., the PDU is less than or equal to 48 bytes long, then a single UNI cell is padded to a full 53 byte size and is used to transmit the PDU.

Figure 6:
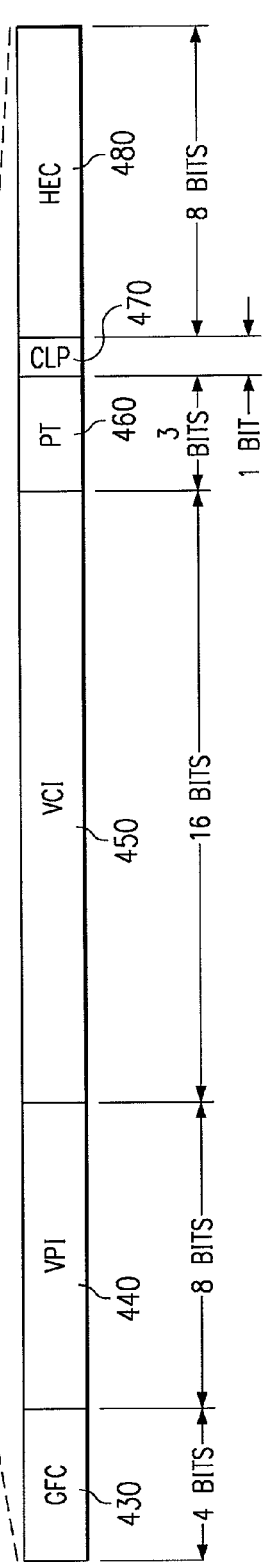
FIG. 6 is a block diagram illustrating a network device and network interface device according to the preferred embodiment of the present invention.

Referring now to FIG. 6 for a block diagram displaying a ND/NID pair according to the preferred embodiment of the present invention. A ND 600 is coupled to a NID 610, which in turn is coupled to a network via a physical network connection 615. While the ND 600 and the NID 610 are shown as separate devices, in many applications such as a laptop computer or a web-enabled cellular telephone, they are integrated together into a single device. Inside the NID 610 is a data handler 620. Other circuitry, such as line drivers, power amplifiers, memory, etc., are also contained inside the NID 610, but are not displayed in FIG. 6 to maintain simplicity.

In the preferred embodiment of the present invention, the data handler 620 is comprised of a data processing block 625, a timer 630, a programmable counter 635, and an interrupt generator 640. In the preferred embodiment of the present invention, the data hander 620 is a task executing on a dedicated digital signal processor (DSP) inside the NID 610. As a result, the data processing block 625, the timer 630, the programmable counter 635, and the interrupt generator 640 are also tasks executing on the DSP. However, the data hander 620 maybe implemented in hardware, along with the data processing block 625, the timer 630, the programmable counter 635, and the interrupt generator 640.

The data processing block 625 is provided with a data stream via a network connection 615. The data processing block 625 has many functions, including, but not limited to: partitioning the data stream into UNI cells by searching for special beginning of cell markers (cell delineation), removing idle cells from the bit stream, and examining the UNI cells for the end-of-PDU marker, i.e., an end-of-packet UNI cell. In an ATM network, a data convergence block would be equivalent to the data processing block. According to the preferred embodiment of the present invention, the data processing block 625 checks the PT field 460 of a newly arrived UNI cell to see if the UNI cell is the last cell of a multi-cell group. The data processing block 625 also saves the UNI cell to a data storage, which is typically (but not necessarily) inside a shared memory 650. The data storage is sized to hold a sufficient number of UNI cells, therefore, preventing most occurrences of data overruns. If the UNI cell had been the last cell of a multi-cell group, then the data processing block 625 increments a count value inside the programmable counter 635.

After the count value inside the programmable counter 635 is incremented, the count value is compared with a prespecified value used to specify how many end-of-packet UNI cells the NID 610 is to receive before the NID 610 is to generate a microprocessor interrupt to inform the ND 600 that new data has arrived. The prespecified value is determined with consideration to network latency guarantees, storage buffer size, etc. As discussed previously, a PDU may be a single UNI cell or it may be multiple UNI cells, therefore the number of received UNI cells is always greater than or equal to the number of received end-of-packet UNI cells. Once the programmable counter 635 has counted the arrival of the prespecified number of end-of-packet UNI cells (the value of the programmable counter 635 is equal to the prespecified number), the programmable counter 635 signals the interrupt generator 640 to generate a microprocessor interrupt to notify the ND 600 of the arrival of new data. In another type of network, where a cell is the smallest unit of data packet and every cell is in essence an end-of-packet UNI cell, then the arrival of each and every cell will result in the programmable counter 635 being incremented.

However, simply counting the arrival of a prespecified number of end-of-packet UNI cells is not sufficient to ensure that network performance guarantees are met. Should the data packets being transmitted be extremely large (resulting in a large number of UNI cells) or if some UNI cells get hung up in the network or if data traffic is very low, a sufficient number of end-of-packet UNI cells may not arrive to cause the programmable counter 635 to signal the interrupt generator 640 to generate a microprocessor interrupt and the ND 600 may not be notified of the received data for an extended amount of time. This can lead to network latencies that exceed the maximum guaranteed latency. The timer 630 is present to prevent this situation from happening. The timer 630 is running simultaneously with the operation of the NID 610. The timer 630 measures the elapsed time from the arrival of the first end-of-packet UNI cell currently being stored in the shared memory 650 to the current time. In another type of network, where cells are processed even if an entire data packet has not arrived or if each cell is a data packet, then the timer 630 can start after the arrival of the first cell.

After each microprocessor interrupt, the timer 630 is reset and it is not restarted until a new end-of-packet UNI cell is received and stored in the shared memory 650, so the timer 630 does not run if there is not a complete data packet stored in the shared memory 650. If and when the timer 630 expires, meaning that data in the shared memory 650 has been stored in memory for too long a period of time, the timer 630 will signal the interrupt generator 640 to notify the ND 600 of the arrival of new data. After the interrupt generator 640 issues the microprocessor interrupt, the timer 630 and the programmable counter 635 are reset. In the earlier discussed case of the programmable counter 635 signaling the interrupt generator 640 to issue a microprocessor interrupt, the timer 630 is also reset after the interrupt generator 640 issues the microprocessor interrupt. Once the microprocessor 645 receives the microprocessor interrupt, it will process the data that is stored in the shared memory 650.

Figure 7:
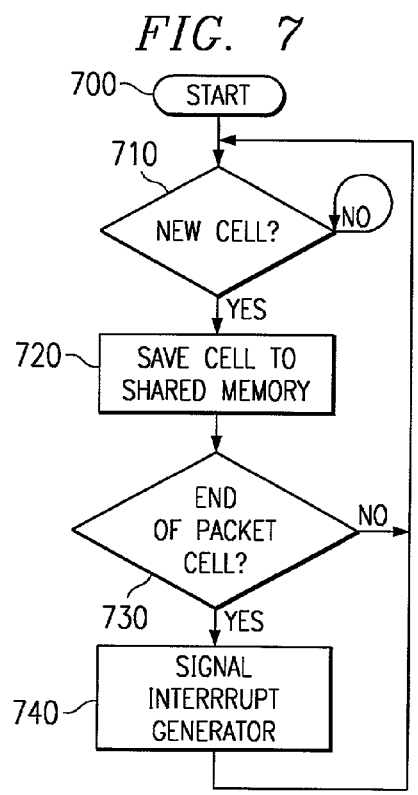
FIG. 7 is a flow diagram illustrating the operation of a preferred embodiment of the present invention.

Refer now to FIG. 7 for a flow diagram illustrating the operation of the NID 610 according to a preferred embodiment of the present invention. The NID 610 initializes into a start block 700 where it immediately transitions into a decision block (block 710) where it waits for arrival of a new UNI cell. The NID 610 will remain in block 710, waiting for a new UNI cell to arrive. When a new UNI cell arrives, the NID 610 saves the UNI cell in the shared memory 650 (block 720). After saving the UNI cell into shared memory 650, the NID 610 checks the UNI cell's header information to see if it is an end-of-packet UNI cell (block 730). If the UNI cell is not an end-of-packet UNI cell, the NID 610 transitions back to the wait block 710 to wait for another UNI cell. If the UNI cell was the end-of-packet UNI cell, then the NID 610 notifies the ND 600 by signaling the interrupt generator 640 to issue a microprocessor interrupt (block 740). When the ND 600 receives the microprocessor interrupt, the microprocessor 645 removes the UNI cell(s) from shared memory 650.

Figure 8:
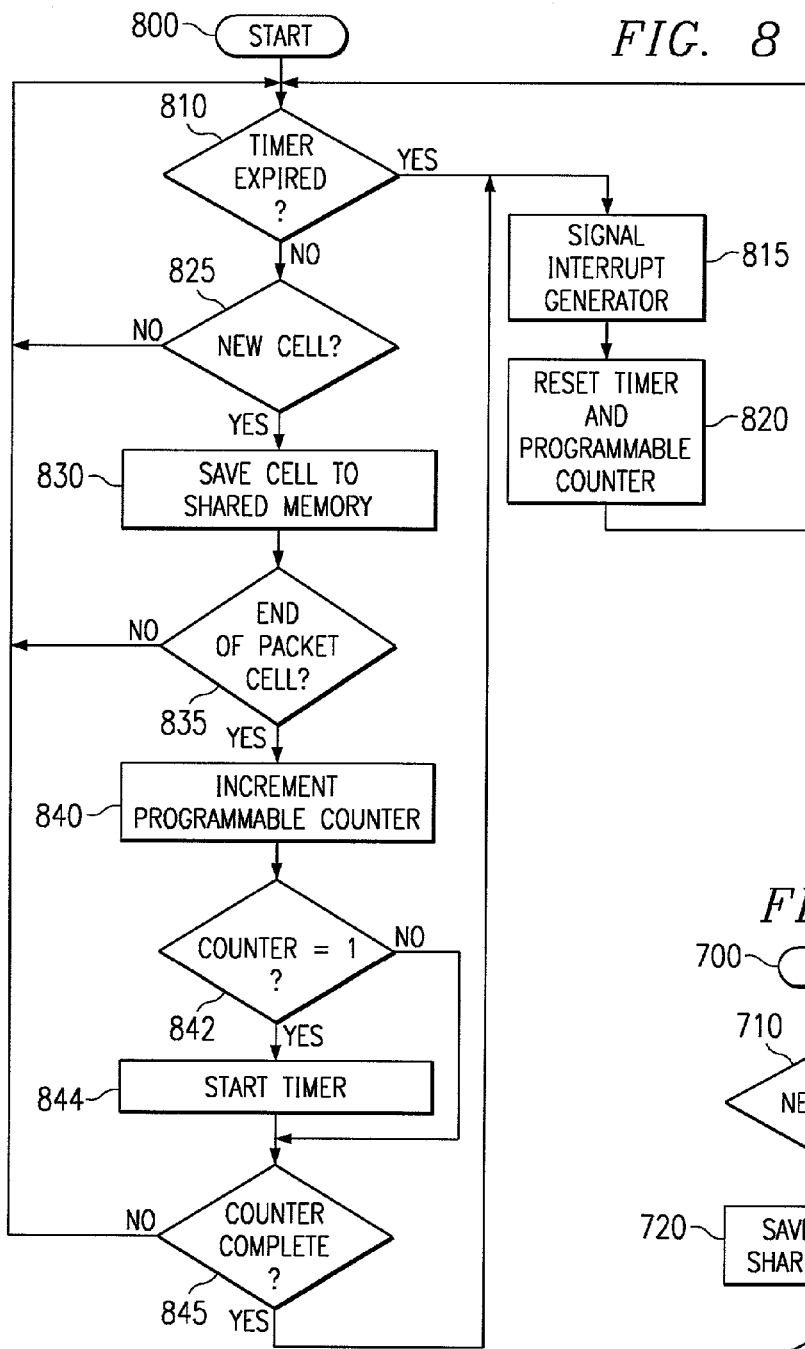
FIG. 8 is a flow diagram illustrating the operation of another preferred embodiment of the present invention.

Refer now to FIG. 8 for a flow diagram illustrating the operation of the NID 610 according to another preferred embodiment of the present invention. The NID 610 initializes into a start block 800 where it immediately transitions into a decision block to check if the timer 630 has expired (block 810). If the timer 630 has expired, the NID 610 signals the interrupt generator 640 to assert a microprocessor interrupt (block 815) and resets the timer 630 and the programmable counter 635 (block 820). As discussed previously, the expiration of the timer 630 signals that UNI cells currently stored in the shared memory 650 have been stored for too long and need to be processed. After signaling the interrupt generator 640 and resetting the timer 630 and the programmable counter 635, the NID 610 returns to decision block 810 to check if the timer 630 has expired. Note that once the timer 630 is reset, it is not restarted until an end-of-packet UNI cell is received.

If the timer 630 has not expired, the NID 610 checks to see if a UNI cell has arrived (block 825). If a UNI cell has not arrived, the NID 610 will transition back to block 810 to repeat the checks for expiration of the timer 630 and arrival of a new UNI cell. The NID 610 will transition between blocks 810 and 825 until either the timer 630 expires or a new UNI cell arrives. If a UNI cell has arrived, the NID 610 will save the UNI cell to shared memory 650 (block 830) and check if the UNI cell is an end-of-packet UNI cell (block 835). If the UNI cell is not an end-of-packet UNI cell, the NID 610 returns to block 810. If the UNI cell is an end-of-packet UNI cell, the NID 610 increments the programmable counter 635 (block 840). The NID 610 then checks to see if the value of the programmable counter 635 is equal to one (1) (block 842), i.e., the PDU just received was the first PDU received since the last microprocessor interrupt. If the value of the programmable counter 635 is equal to one, then the NID 610 starts the timer 630 (block 844). If the value of the programmable counter 635 is not equal to one, the NID 610 checks to see if the programmable counter's 635 count is complete, i.e., if it is equal to the prespecified number of end-of-packet UNI cells (block 845). If it does not, then the NID 610 returns to block 810. If the programmable counter's 635 count is equal to the prespecified number of end-of-packet UNI cells, then the NID 610 signals the interrupt generator 640 to assert a microprocessor interrupt and resets the programmable counter 635 and the timer 630 (blocks 815 and 820) and transitions back to block 810 to repeat the process. When the ND 600 receives the microprocessor interrupt, the microprocessor 645 removes the UNI cell(s) from shared memory 650.

In another preferred embodiment of the present invention, the prespecified number of end-of-packet UNI cells received by the NID 610 before it asserts a microprocessor interrupt is varied depending on a logical network connection's priority level. A ND/NID pair will typically have a single physical network connection (a cable or a wireless connection connecting the ND/NID to the network) and multiple logical network connections. A logical network connection is a virtual connection between an application executing in the ND 600 and some other application executing on another ND somewhere else in the network. More than one logical network connection may exist on a single physical network connection. Data travelling on the multiple logical network connections are interleaved, sharing the bandwidth of the physical network connection. If the logical network connection's priority is high, then the prespecified number of end-of-packet UNI cells is set to a small number and if the logical network connection's priority is low, then the specified number of end-of-packet UNI cells is set to a large number. For instance, in a telephone call or a video conference where network latency must be small, the specified number of end-of-packet UNI cells may be set to a small number in order to ensure small latencies. While in a file transfer application where overall network throughput is more important than latency, the specified number of end-of-packet UNI cells may be large since response time is not a critical issue.

Another alternative embodiment of the present invention involves adjusting the prespecified number of end-of-packet UNI cells received by the NID 610 before it asserts a microprocessor interrupt depending on the physical network connection itself. In a high-speed network connection, the specified number of end-of-packet UNI cells may be set to a large value because of the relatively small amount of time it takes to receive a large number of UNI cells. In a low-speed network connection, the specified number of end-of-packet UNI cells may be set to a small value since a large amount of time may expire prior to the NID 610 receiving even a single end-of-packet UNI cell. By setting the specified number of end-of-packet UNI cells based on the speed of the physical network connection, network performance guarantees are ensured without placing an undo burden on the ND 600. Setting the specified number of end-of-packet UNI cells to a small value in a high-speed network will result in a large number of microprocessor interrupts in a short period of time because a large number of end-of-packet UNI cells can arrive within a short period of time in a high-speed network. The reverse is true for a low speed network and a large value for the specified number of end-of-packet UNI cells where network latency guarantees may expire before very many end-of-packet UNI cells arrive at the NID 610.

Yet another alternative embodiment of the present invention is to have the network interface device set the prespecified number of end-of-packet UNI cells dependent upon the data stream's ATM Adaption Layer (AAL) which depends upon the type of data traffic being transmitted. For example, AAL-2 is for low data-rate data transfers with high delay sensitivity. AAL-2 type data traffic would then require a low number of end-of-packet UNI cells. AAL-5 on the other hand is for low overhead communications wishing to transfer large amounts of data, which would be supported with a large number of end-of-packet UNI cells to reduce overloading the microprocessor.

Traffic type can allow prioritizing of available resources, i.e., by setting the timer 630 and the programmable counter 635. For example, a logical network connection carrying an interactive chat session with another user from another continent will be set with a large number of end-of-packet UNI cells required prior to interrupting the ND 600 since interactive chat sessions are very high latency, have low bandwidth requirements, and users expect poor performance. While a different logical network connection with a telephone call will be set with a small number of end-of-packet UNI cells required prior to interrupting the ND 600 because telephone calls requires a very low latency connection.

Other embodiments involving changing the elapsed time timer 630 to ensure that network latencies meet performance guarantees are also possible. One can set the elapsed time timer 630 depending upon the specific needs of the logical network connection, the speed of the physical network connection, and the type and originating location of the logical network connection. Embodiments involving varying the elapsed time timer 630 other than those described above are possible, including embodiments that combine changing both the elapsed time timer 630 and the programmable counter 635 are also possible.

The discussion of the preferred embodiment of the present invention as presented in these specifications describes the invention being implemented on a dedicated digital signal processor (DSP). However, the preferred embodiment of the present invention can be implemented on a general purpose digital signal processor, a special purpose microprocessor, a general purpose microprocessor, or specially designed hardware and firmware.

As will be apparent from the above description, the preferred embodiments provide several advantageous features including a configurable apparatus capable of providing high-bandwidth and low latency communications without the need to add a significant amount of hardware. The apparatus can be configured based upon the speed of the network, the priority of the logical network connections, and the type of applications actually using the network.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An apparatus for improving information transfers in network applications comprising:
   a data input, coupled to a data processing block, configured to receive data;
   a programmable counter, having a first input coupled to said data processing block and a second input coupled to an interrupt generator and an output coupled to said interrupt generator, said programmable counter is configured to increment a value stored in said programmable counter each time said programmable counter receives a signal from said data processing block and compare said value stored in said programmable counter with a count threshold, and signal said interrupt generator when said value stored in said programmable counter is equal to said count threshold;

said interrupt generator, having an input coupled to said programmable counter and an output coupled to a signal output, configured to generate an interrupt upon receipt of a signal from said programmable counter;

said data processing block, having an input coupled to said data input and an output coupled to said programmable counter, the data processing block is conjured to examine said data from said data input for presence of an end-of-packet flag and signal said programmable counter upon detecting said end-of-packet flag; and said signal output, coupled to said interrupt generator, is configured to output said interrupt.

2. An apparatus according to claim 1, wherein said data processing block is configured to signal said programmable counter upon detecting an end-of-PDU marker.

3. An apparatus according to claim 1, wherein:

said interrupt generator having a second input coupled to a timer and an output coupled to said timer; and said timer having an input coupled to said interrupt generator and an output coupled to said interrupt generator, the timer is configured adapted to begin measuring elapsed time upon arrival of a first data packet and signal said interrupt generator when said elapsed time is equal to a time threshold.

4. An apparatus according to claim 3, wherein said timer is configured to begin measuring elapsed time upon arrival of a first end-of-PDU marker.

5. An apparatus according to claim 3, wherein said programmable counter and said timer are reset after said programmable counter signals said interrupt generator.

6. An apparatus according to claim 3, wherein said programmable counter and said timer are reset after said timer signals said interrupt generator.

7. An apparatus according to claim 1, wherein said programmable counter is reset after said programmable counter signals said interrupt generator.

8. A network device with an apparatus for improved information transfer in network connections comprising:

a data input configured to receive data;

said data processing block, having an input coupled to said data input and an output coupled to a programmable counter and a shared memory, configured to saving said data to said shared memory, examining said data from said data input for presence of an end-of-packet flag, and signaling said programmable counter upon detecting said end-of-packet flag;

a programmable counter, having a first input coupled to said data processing block and a second input coupled to an interrupt generator and an output coupled to said interrupt generator, configured to increment a value stored in said programmable counter each time said programmable counter receives a signal from said data processing block and compare said value stored in said programmable counter with a count threshold and signal said interrupt generator when said value stored in said programmable counter is equal to said count threshold;

said interrupt generator, having an input coupled to said programmable counter and an output coupled to a network device microprocessor, configured to generate an interrupt upon receipt of signal from said programmable counter;

said network device microprocessor, having a first input coupled to said interrupt generator and a second input coupled to said shared memory, configured to receive said interrupt signal from said intermit generator, and read said data from said shared memory; and said shared memory, coupled to said network device microprocessor and said data processing block, configured to store said data.

9. A network device according to claim 8, wherein said data processing block is configured to signal said programmable counter upon detecting an end-of-PDU marker.

10. A network device according to claim 8, wherein:

said interrupt generator having a second input coupled to a timer; and said timer having an input coupled to said interrupt generator and an output coupled to said interrupt generator, configured to begin measuring elapsed time upon arrival of a first data packet and signal said interrupt timer when said elapsed time is equal to a time threshold.

11. A network device according to claim 10, wherein said timer is configured to begin measuring elapsed time upon arrival of a first end-of-PDU marker.

12. A network device according to claim 10, wherein said programmable counter and said timer are reset after said programmable counter signals said interrupt generator.

13. A network device according to claim 10, wherein said programmable counter and said timer are reset after said timer signals said interrupt generator.

14. A network device according to claim 10, wherein each network connection has a different programmable counter and a different timer associated with each logical network connection.

15. A network device according to claim 8, wherein said programmable counter is reset after said programmable counter signals said interrupt generator.

16. A network device according to claim 8, wherein each network connection has a different programmable counter associated with each logical network connection.

* * * * *